(12) United States Patent
Tomitani

(10) Patent No.: US 11,587,522 B2
(45) Date of Patent: Feb. 21, 2023

(54) DISPLAY DEVICE

(71) Applicant: Japan Display Inc., Tokyo (JP)

(72) Inventor: Hisashi Tomitani, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/368,963

(22) Filed: Jul. 7, 2021

(65) Prior Publication Data

US 2021/0335312 A1    Oct. 28, 2021

Related U.S. Application Data

(63) Continuation of application No. PCT/JP2019/045324, filed on Nov. 19, 2019.

(30) Foreign Application Priority Data

Jan. 17, 2019    (JP) .............................. JP2019-006365

(51) Int. Cl.
*G09G 3/36* (2006.01)
*G09G 3/34* (2006.01)

(52) U.S. Cl.
CPC ......... *G09G 3/3677* (2013.01); *G09G 3/3413* (2013.01); *G09G 3/3614* (2013.01);
(Continued)

(58) Field of Classification Search
CPC .. G09G 3/3677; G09G 3/3648; G09G 3/3696; G09G 3/3266; G09G 3/3614;
(Continued)

(56) References Cited

U.S. PATENT DOCUMENTS

2006/0256069 A1* 11/2006 Okazaki ............... G09G 3/3655
345/102
2009/0073343 A1* 3/2009 Kojima ................ G09G 3/3406
349/72
(Continued)

FOREIGN PATENT DOCUMENTS

JP    H-0277722 A    3/1990
JP    H-0451116 A    2/1992
(Continued)

OTHER PUBLICATIONS

International Search Report issued in International Patent Application No. PCT/JP2019/045324 dated Feb. 18, 2020 and English translation of same. 7 pages.

(Continued)

*Primary Examiner* — Dismery Mercedes
(74) *Attorney, Agent, or Firm* — K&L Gates LLP

(57) ABSTRACT

A display device includes a liquid crystal display panel, two electrodes in the liquid crystal display panel, a switching element having a source and a drain one of which is coupled to one of the two electrodes, a scan line coupled to a gate of the switching element, a signal line coupled to the other of the drain and the source, an inversion driver, and a scan circuit configured to provide, to the scan line, any of a first potential, a second potential, and a third potential lower than the second potential. The scan circuit switches a potential of the scan line from the second potential to the third potential at a timing at which the potential of the other of the two electrodes is made lower than that of the one of the two electrodes in a period in which the source and the drain are electrically disconnected.

21 Claims, 13 Drawing Sheets

(52) U.S. Cl.
CPC ......... *G09G 3/3648* (2013.01); *G09G 3/3696* (2013.01); *G09G 2310/08* (2013.01); *G09G 2320/0247* (2013.01); *G09G 2320/043* (2013.01); *G09G 2320/0626* (2013.01)

(58) Field of Classification Search
CPC ... G09G 2300/0819; G09G 2300/0861; G09G 2310/0286; G09G 3/3674; G09G 3/3413; G09G 2320/0247; G09G 2320/043; G09G 2320/0626; G09G 2310/0283; G09G 2320/0242; G09G 2320/0257; G09G 2320/02; G02F 1/13624; G02F 1/136286
See application file for complete search history.

(56) References Cited

U.S. PATENT DOCUMENTS

| | | | | |
|---|---|---|---|---|
| 2009/0079715 | A1* | 3/2009 | Kim | G09G 3/3677 326/88 |
| 2009/0231263 | A1* | 9/2009 | Liao | G09G 3/3413 345/102 |
| 2012/0320018 | A1* | 12/2012 | Saitoh | G09G 3/3655 345/94 |
| 2014/0071105 | A1* | 3/2014 | Nakanishi | G09G 3/3614 345/96 |
| 2015/0049071 | A1* | 2/2015 | Kaneko | G09G 3/3648 345/92 |
| 2016/0246102 | A1* | 8/2016 | Hsu | H04N 13/398 |
| 2018/0211630 | A1 | 7/2018 | Kato | |
| 2018/0231836 | A1* | 8/2018 | Suzuki | G02F 1/13471 |
| 2018/0233097 | A1* | 8/2018 | Konoshita | G09G 3/3648 |
| 2020/0013366 | A1* | 1/2020 | Tominaga | G09G 3/3677 |

FOREIGN PATENT DOCUMENTS

| | | |
|---|---|---|
| JP | H-05346571 A | 12/1993 |
| JP | 2002-287708 A | 10/2002 |
| JP | 2006-171084 A | 6/2006 |
| JP | 2010-097420 A | 4/2010 |
| JP | 2018-120024 A | 8/2018 |

OTHER PUBLICATIONS

Written Opinion issued in International Patent Application No. PCT/JP2019/045324 dated Feb. 18, 2020. 3 pages.

* cited by examiner

DISPLAY DEVICE

CROSS-REFERENCE TO RELATED APPLICATION

This application claims the benefit of priority from Japanese Patent Application No. 2019-006365 filed on Jan. 17, 2019 and International Patent Application No. PCT/JP2019/045324 filed on Nov. 19, 2019, the entire contents of which are incorporated herein by reference.

BACKGROUND

1. Technical Field

What is disclosed herein relates to a display device.

2. Description of the Related Art

Liquid crystal display devices configured to control pixels such that light in a plurality of colors passes through the same pixel at different timings have been known (for example, Japanese Patent Application Laid-open Publication No. 2010-097420).

When a direct current (DC current) flows through the liquid crystal in the liquid crystal display device, problems such as reduction in lifetime of liquid crystal and occurrence of flickers are caused. Therefore, a method for adjusting a potential difference between two electrodes facing each other with the liquid crystal interposed therebetween is required in order to reduce the DC current as much as possible.

For the foregoing reasons, there is a need for a display device capable of preventing reduction in lifetime due to a DC current flowing through liquid crystal with higher display quality.

SUMMARY

According to an aspect, a display device includes: a liquid crystal display panel in which a liquid crystal is sealed between two substrates facing each other; two electrodes provided in the liquid crystal display panel and configured to be provided with a potential difference for controlling orientation of the liquid crystal; a switching element having a source and a drain one of which is coupled to one of the two electrodes; a scan line coupled to a gate of the switching element and configured to be provided with a potential for causing the source and the drain of the switching element to be electrically connected or disconnected; a signal line coupled to the other of the drain and the source; an inversion driver configured to invert relative potential high-low levels between a potential of one of the two electrodes and a potential of the other of the two electrodes at a predetermined cycle; and a scan circuit configured to provide any one of a first potential, a second potential, and a third potential to the scan line. The first potential is a potential for causing the source and the drain to be electrically connected, the second potential is a potential for causing the source and the drain to be electrically disconnected, and the third potential is a potential for causing the source and the drain to be electrically disconnected and is lower than the second potential. The source and the drain are caused to be electrically connected and disconnected multiple times in the predetermined cycle, and the scan circuit switches a potential of the scan line from the second potential to the third potential at a timing at which the potential of the other of the two electrodes is made relatively lower than the potential of the one of the two electrodes in a period in which the source and the drain are electrically disconnected.

DETAILED DESCRIPTION

Figure 1:
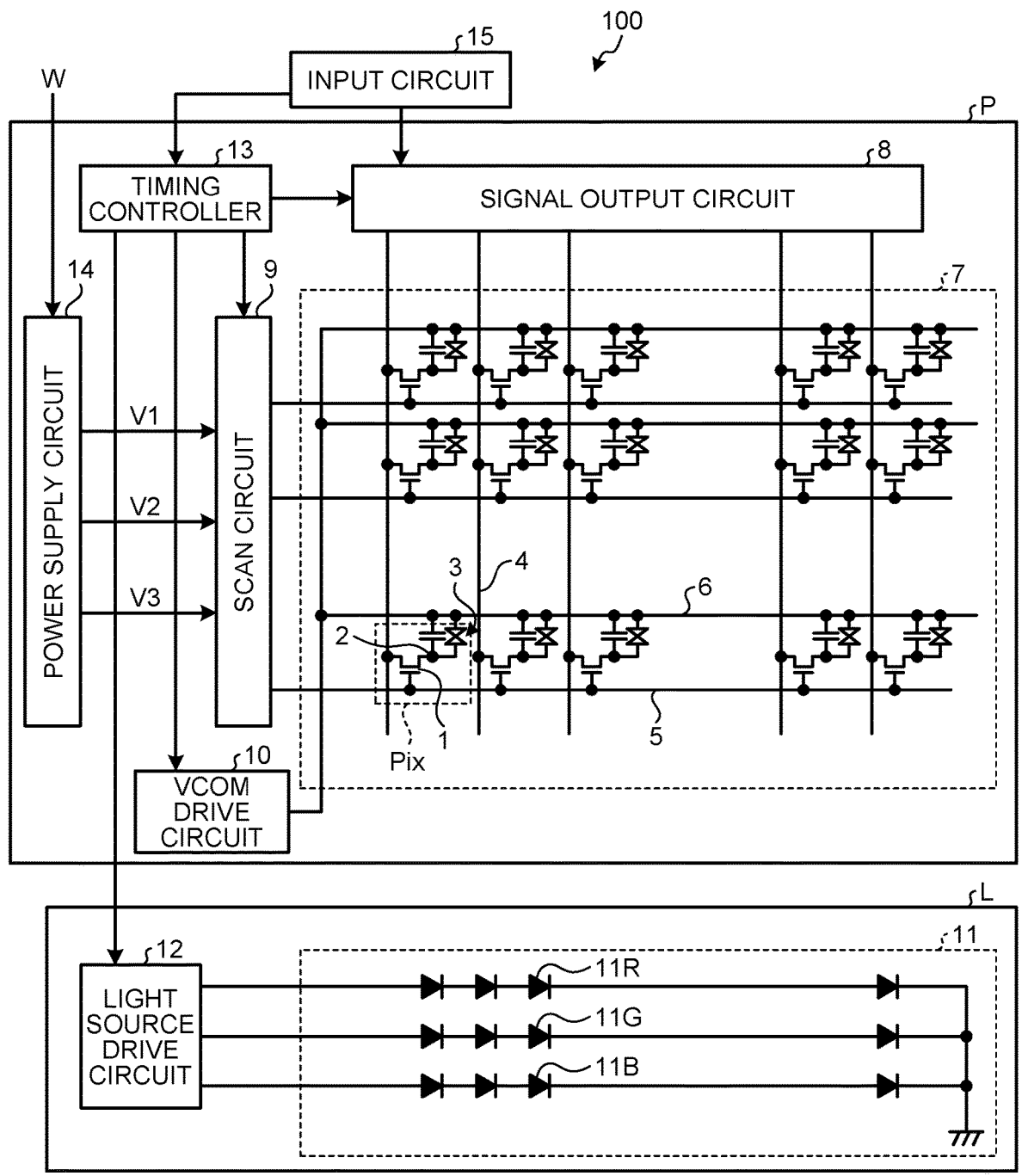
FIG. 1 is a schematic circuit diagram illustrating the main configuration of a display device.

Hereinafter, embodiments of the present disclosure will be described with reference to the drawings. The present disclosure is merely an example, and it is reasonable that appropriate modifications within the gist of the present disclosure at which those skilled in the art can easily arrive are encompassed in the range of the present disclosure. In the drawings, widths, thicknesses, shapes, and the like of components can be schematically illustrated in comparison with actual modes for more clear explanation. They are however merely examples and do not limit interpretation of the present disclosure. In the present specification and the drawings, the same reference signs denote components similar to those described before with reference to the drawing that has been already referred, and detail explanation thereof can be appropriately omitted.

In this disclosure, when an element is described as being "on" another element, the element can be directly on the other element, or there can be one or more elements between the element and the other element.

First Embodiment

FIG. 1 is a schematic circuit diagram illustrating the main configuration of a display device 100. The display device 100 includes a liquid crystal display panel P and a light source device L. The liquid crystal display panel P includes a display region 7, a signal output circuit 8, a scan circuit 9, a VCOM drive circuit 10, a timing controller 13, and a power supply circuit 14. Hereinafter, one surface of the liquid crystal display panel P that the display region 7 faces is a display surface whereas the other surface thereof is a rear surface.

Figure 2:
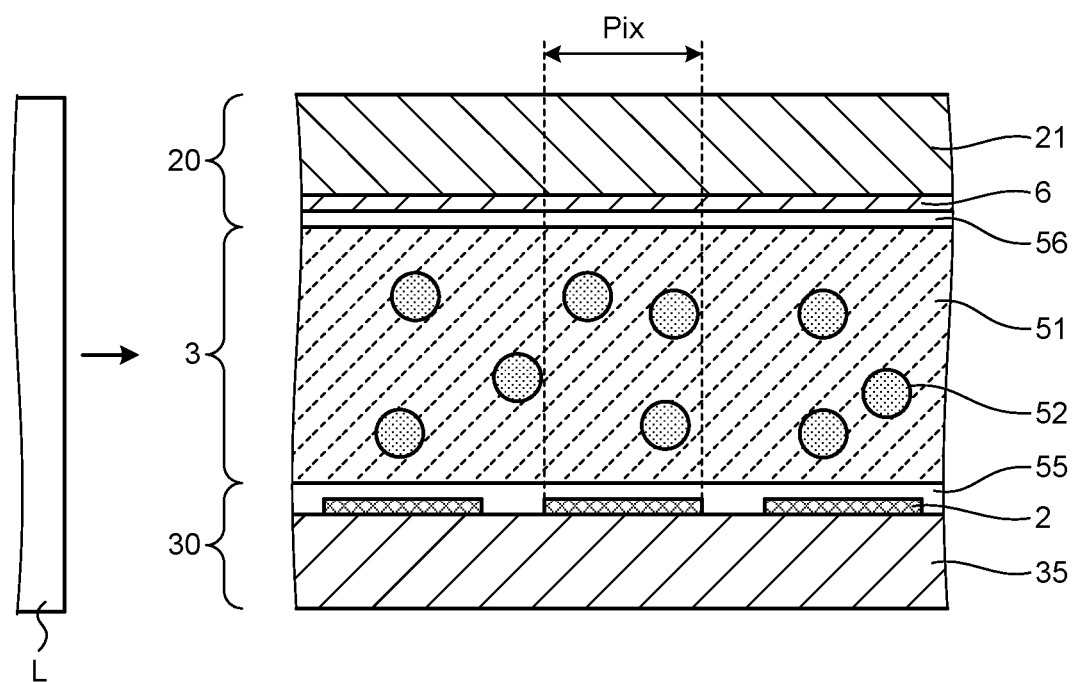
FIG. 2 is a schematic cross-sectional view of a liquid crystal display panel.

A plurality of pixels Pix are arranged in a matrix with a row-column configuration in the display region 7. Each pixel Pix includes a switching element 1 and two electrodes. In FIG. 1 and FIG. 2, which will be described later, a pixel electrode 2 and a common electrode 6 are illustrated as the two electrodes.

FIG. 2 is a schematic cross-sectional view of the liquid crystal display panel P. The liquid crystal display panel P has two substrates facing each other and a liquid crystal 3 sealed between the two substrates. Hereinafter, one of the two substrates is a first substrate 30 whereas the other thereof is a second substrate 20.

The first substrate 30 includes a translucent glass substrate 35, the pixel electrodes 2 stacked on the glass substrate 35 on the second substrate 20 side, and an insulating layer 55 stacked on the second substrate 20 side so as to cover the pixel electrodes 2. The pixel electrodes 2 are individually provided for the respective pixels Pix. The second substrate 20 includes a translucent glass substrate 21, the common electrode 6 stacked on the glass substrate 21 on the first substrate 30 side, and an insulating layer 56 stacked on the first substrate 30 side so as to cover the common electrode 6. The common electrode 6 has a plate-like or film-like shape and is shared among the pixels Pix.

The liquid crystal 3 in the first embodiment is a polymer dispersion type liquid crystal. To be specific, the liquid crystal 3 includes a bulk 51 and fine particles 52. The orientation of the fine particles 52 is changed in accordance with the potential difference between the pixel electrodes 2 and the common electrode 6 in the bulk 51. The potentials of the pixel electrodes 2 for the respective pixels Pix are individually controlled, whereby at least either of the degree of translucency or dispersion for each pixel Pix is controlled.

In the first embodiment described with reference to FIG. 2, the pixel electrodes 2 and the common electrode 6 face each other with the liquid crystal 3 interposed therebetween. Alternatively, the liquid crystal display panel P may have a configuration in which the pixel electrodes 2 and the common electrode 6 are provided on one substrate and the orientation of the liquid crystal 3 is controlled with electric fields generated by the pixel electrodes 2 and the common electrode 6. The liquid crystal 3 may be liquid crystal other than the polymer dispersion type liquid crystal.

Next, a mechanism of controlling the potentials of the pixel electrodes 2 and the common electrode 6 will be described. As illustrated in FIG. 1, each switching element 1 is a switching element that is made using a semiconductor, such as a thin film transistor (TFT). One of the source and the drain of the switching element 1 is coupled to one (pixel electrode 2) of the two electrodes. The other of the source and the drain of the switching element 1 is coupled to a signal line 4. The gate of the switching element 1 is coupled to a scan line 5. The scan line 5 applies a potential for causing the source and the drain of the switching element 1 to be electrically connected to or disconnected from each other under control by the scan circuit 9. The scan circuit 9 controls the potential. Details of the potential control by the scan circuit 9 will be described later.

In the example illustrated in FIG. 1, the signal lines 4 are aligned along one (row direction) of the array directions of the pixels Pix. The signal lines 4 extend along the other (column direction) of the array directions of the pixels Pix. The switching elements 1 of the pixels Pix aligned in the column direction share one of the signal lines 4 among one another. The scan lines 5 are aligned along the column direction. The scan lines 5 extend along the row direction. The switching elements 1 of the pixels Pix aligned in the row direction share one of the scan lines 5 among one another.

The common electrode 6 is coupled to a VCOM drive circuit 10. The VCOM drive circuit 10 supplies a reference potential to the common electrode 6. The signal output circuit 8 outputs pixel signals to the signal lines 4 at a timing at which the scan circuit 9 supplies a potential (first potential) as a drive signal to the scan line 5, thereby charging the liquid crystal (fine particles 52) as storage capacitance and capacitive load formed between the pixel electrodes 2 and the common electrode 6. The voltage of each pixel Pix thereby becomes a voltage corresponding to the pixel signal. The liquid crystal (fine particles 52) as the storage capacitance and the capacitive load holds the pixel signal after completion of application of the first potential. The orientation of the liquid crystal (fine particles 52) is controlled in accordance with the electric field generated by the voltage of the pixel Pix and the voltage of the common electrode 6.

As illustrated in FIG. 2, the light source device L is arranged on the lateral side of the liquid crystal display panel P. The light source device L includes a light source 11 and a light source drive circuit 12. The light source 11 includes a first light source 11R emitting light in red, a second light source 11G emitting light in green, and a third light source 11B emitting light in blue. The first light source 11R, the second light source 11G, and the third light source 11B emit light under control of the light source drive circuit 12. The first light source 11R, the second light source 11G, and the third light source 11B in the first embodiment are light sources using light emitting elements such as light emitting diodes (LEDs), for example. They are however not limited thereto, and it is sufficient that they are light sources the light emission timings of which can be controlled. The light source drive circuit 12 controls the light emission timings of the first light source 11R, the second light source 11G, and the third light source 11B under control of the timing controller 13. In the example illustrated in FIG. 2, the light source device L is arranged on the lateral side of the liquid crystal display panel P, and light from the light source 11 is emitted from the lateral side of the liquid crystal display panel P. Alternatively, the light source 11 may be arranged on the rear surface side of the display device 100.

The timing controller 13 controls operation timings of the signal output circuit 8, the scan circuit 9, the VCOM drive circuit 10, and the light source drive circuit 12. In the first embodiment, field sequential control is performed.

Figure 3:
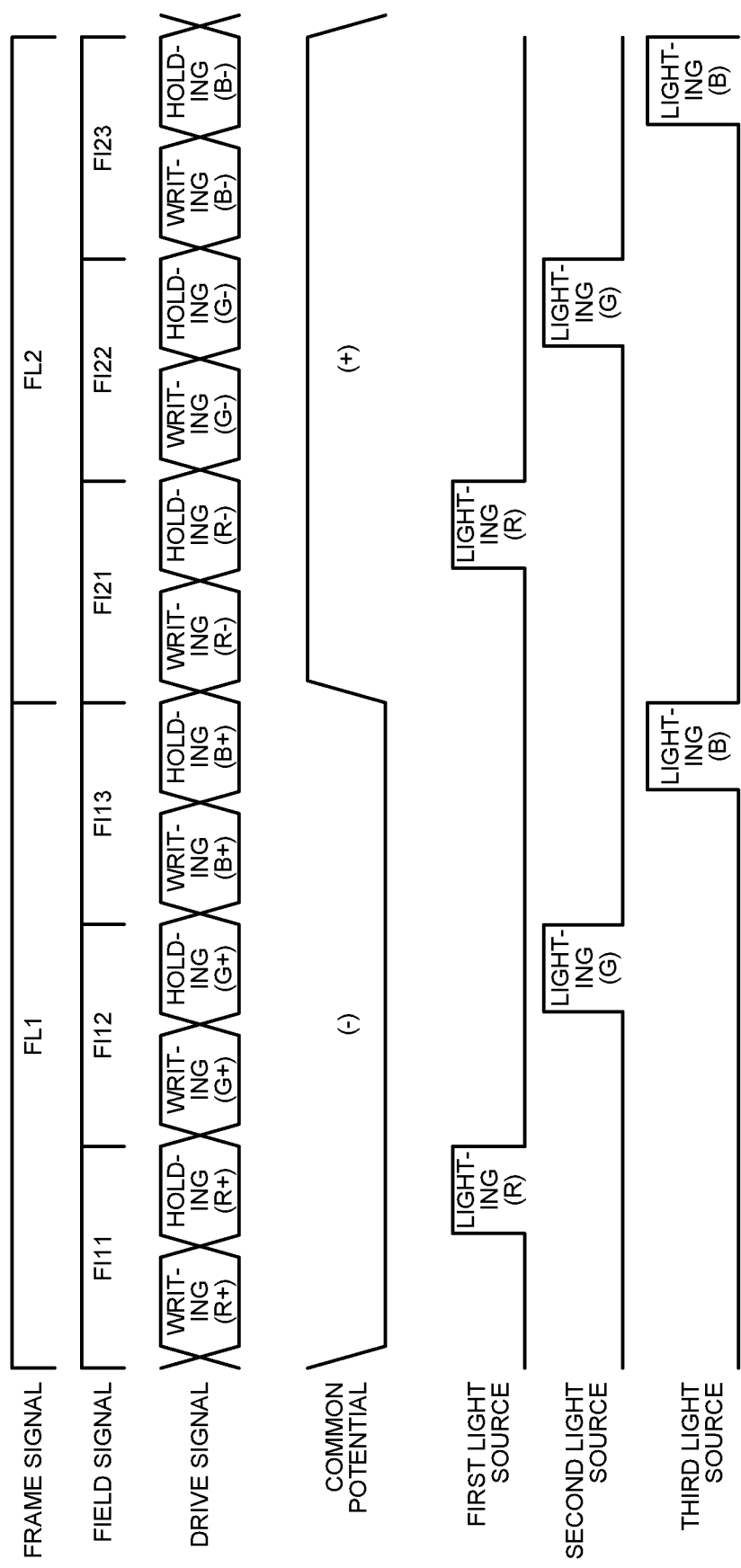
FIG. 3 is a timing chart illustrating an example of the flow of field sequential control.

FIG. 3 is a timing chart illustrating an example of flow of the field sequential control. FIG. 3 illustrates the schematic timing chart in two frame periods. The timing chart in FIG. 3 includes information indicating output of a frame signal, output of a field signal, switching of the drive signal, switching of the common potential, and the lighting timings of the first light source 11R, the second light source 11G, and the third light source 11B. The switching of the drive signal indicates switching of the potentials of the scan lines 5. The switching of the common potential indicates switching of the potential of the common electrode 6.

The frame signal is a signal indicating a start timing of each frame period. FIG. 3 indicates that the frame signal is output at the start time of a period FL1 of a first frame, at the start time of a period FL2 of a second frame, and at the start time of a period of a subsequent frame (third frame) after the second frame is finished.

The field signal is a signal indicating a start timing of each of field periods included in each frame period. One frame period includes the field periods the number of which corresponds to the number of colors of light emitted from the light source 11. FIG. 3 indicates that, under the timing control of the timing controller 13, the field signal is output by the signal output circuit 8 at the start time of each of a first field period FI11, a second field period FI12, and a third field period FI13 included in the period FL1 of the first frame, a first field period FI21, a second field period FI22, and a third field period FI23 included in the period FL2 of the second frame, and a first field period in the period of the subsequent frame (third frame) after the second frame is finished.

Each of the field periods includes a writing period of the pixel signal and a holding period of the pixel signal by the storage capacitance. Writing (R+) in FIG. 3 is the writing period of the first field period FI11. Holding (R+) is the holding period of the first field period FI11. Writing (G+) is the writing period of the second field period FI12. Holding (G+) is the holding period of the second field period FI12. Writing (B+) is the writing period of the third field period FI13. Holding (B+) is the holding period of the third field period FI13. Writing (R−) is the writing period of the first field period FI21. Holding (R−) is the holding period of the first field period FI21. Writing (G−) is the writing period of the second field period FI22. Holding (G−) is the holding period of the second field period FI22. Writing (B−) is the writing period of the third field period FI23. Holding (B−) is the holding period of the third field period FI23.

The writing periods included in the field periods in one frame period are periods in which the pixel signals corresponding to gradation values of different colors are written. For example, when the pixel signals of the first frame are expressed by the gradation values of RGB, it is assumed that (R, G, B)=(r1, g1, b1) is satisfied. In this case, the pixel signal corresponding to the gradation value of "r1" is written in the writing period of the first field period FI11. The pixel signal corresponding to the gradation value of "g1" is written in the writing period of the second field period FI12. The pixel signal corresponding to the gradation value of "b1" is written in the writing period of the third field period FI13. The holding periods included in the field periods in one frame period are periods in which the pixel signals corresponding to the gradation values of the different colors are held.

The light sources (for example, the first light source 11R, the second light source 11G, and the third light source 11B) of the colors included in the light source 11 are controlled to be lighted in the holding periods of the corresponding field periods. For example, the first light source 11R is a red light source, the second light source 11G is a green light source, and the third light source 11B is a blue light source. For example, the first light source 11R is lighted in the holding period of the first field period FI11 in the period FL1 of the first frame. With this operation, scattered light in red in accordance with a voltage corresponding to the gradation value (r1) of red (R) that has been written in the writing period of the first field period FI11 is emitted. The second light source 11G is lighted in the second field period FI12 in the period FL1 of the first frame. With this operation, scattered light in green in accordance with a voltage corresponding to the gradation value (g1) of green (G) that has been written in the writing period of the second field period FI12 is emitted. The third light source 11B is lighted in the third field period FI13 in the period FL1 of the first frame. With this operation, scattered light in blue in accordance with a voltage corresponding to the gradation value (b1) of blue (B) that has been written in the writing period of the third field period FI13 is emitted. As described above, in one frame period, writing and holding of the pixel signals of R, G, and B and illumination with light from the light sources of the corresponding colors are performed, so that color corresponding to the image data of RGB is reproduced in one frame period. Color is reproduced, with the same mechanism, in the period FL2 of the second frame and subsequent periods.

The frequency of the field periods is calculated by multiplying the frequency of the frame periods by the number of colors of light that is emitted from the light source 11. Although the frequency of the frame periods is, for example, 60 Hz in the first embodiment, the frequency is not limited thereto and may be 120 Hz or another frequency. When the frequency of the frame periods is 60 Hz, the frequency of the field periods in the first embodiment is 180 Hz. The frequency of the field periods can be appropriately changed in accordance with the frequency of the frame periods and the number of colors of light that is emitted from the light source 11.

FIG. 3 illustrates the writing periods and the holding periods such that the writing periods and the holding periods have approximately the same length of time in appearance. The holding periods are however longer than the writing periods in practice.

In the liquid crystal display panel P using the liquid crystal, inversion driving of inverting relative high-low levels of a potential of one of two electrodes and a potential of the other of the two electrodes is performed at a predetermined cycle. In FIG. 3, the VCOM drive circuit 10 controls the potential of the common electrode 6 such that the common potential is a negative (−) potential in the period FL1 of the first frame and the common potential is a positive (+) potential in the period FL2 of the second frame. In correspondence thereto, the pixel signals are written such that the potentials of the pixel electrodes 2 are positive (+) potentials in the period FL1 of the first frame, and the pixel signals are written such that the potentials of the pixel electrodes 2 are negative (−) potentials in the period FL2 of the second frame. Reference signs in parentheses in illustration of the drive signal illustrated in FIG. 3 indicate combinations of the colors of the gradation values of RGB and the potentials corresponding to the pixel signals to be written.

In the pixels Pix in the first embodiment, the potentials of the pixel electrodes 2 are controlled to perform the inversion driving. To be specific, the signal output circuit 8 outputs the pixel signals for the inversion driving to the signal lines 4. That is to say, the signal output circuit 8 outputs the pixel signals such that the voltages between the pixel electrodes 2 and the common electrode 6 have the same amplitude and different polarities in accordance with timings of the inversion driving of the common electrode 6. The VCOM drive circuit 10 performs the switching of the potential of the common electrode 6 for the inversion driving. The timing controller 13 synchronizes the switching timing of the potentials of the pixel electrodes 2 performed by an inversion drive circuit and the switching timing of the potential of the common electrode 6 performed by the VCOM drive circuit 10 at a frame period cycle. These elements function as an inversion driver in the first embodiment.

In the example illustrated in FIG. 3, the inversion driving is performed on a frame period basis such that the potentials of the pixel electrodes 2 are relatively higher than that of the common electrode 6 in the period FL1 of the first frame and the potentials of the pixel electrodes 2 are relatively lower than that of the common electrode 6 in the period FL2 of the second frame. This is merely a specific control example of the inversion driving system, and the present disclosure is not limited thereto. For example, the high-low levels of the potentials of the pixel electrodes 2 and that of the common electrode 6 may be inverted on a plurality of frame periods basis.

An image signal (RGB data) as an original of the pixel signals is input to the liquid crystal display panel P through an input circuit 15 included in an external image output device, for example. The input circuit 15 outputs, to the signal output circuit 8, signals indicating the gradation values of the colors of red (R), green (G), and blue (B) for each pixel Pix based on the image signal. The input circuit 15 outputs, to the timing controller 13, a synchronization signal synchronized with the input timing of a signal for the signal output circuit 8 and other control signals. The timing controller 13 controls the operations of the signal output circuit 8, the scan circuit 9, the VCOM drive circuit 10, and the like based on the signals input from the input circuit 15. The input circuit 15 may be provided in the liquid crystal display panel P. The input circuit 15 may be provided as one function of a display driver integrated circuit (DDIC) designed to integrate other circuits including the timing controller 13.

The scan circuit 9 in the first embodiment performs scanning to shift the driving timing of the pixels Pix of each row on a scan line 5 basis. The timing of the writing period is different depending on the rows of the pixels Pix. In one field period, difference in the timing of the writing period between the row of the pixels Pix the writing period of each of which is provided first in the scanning and the row of the pixels Pix the writing period of each of which is provided last in the scanning is maximum.

Figure 4:
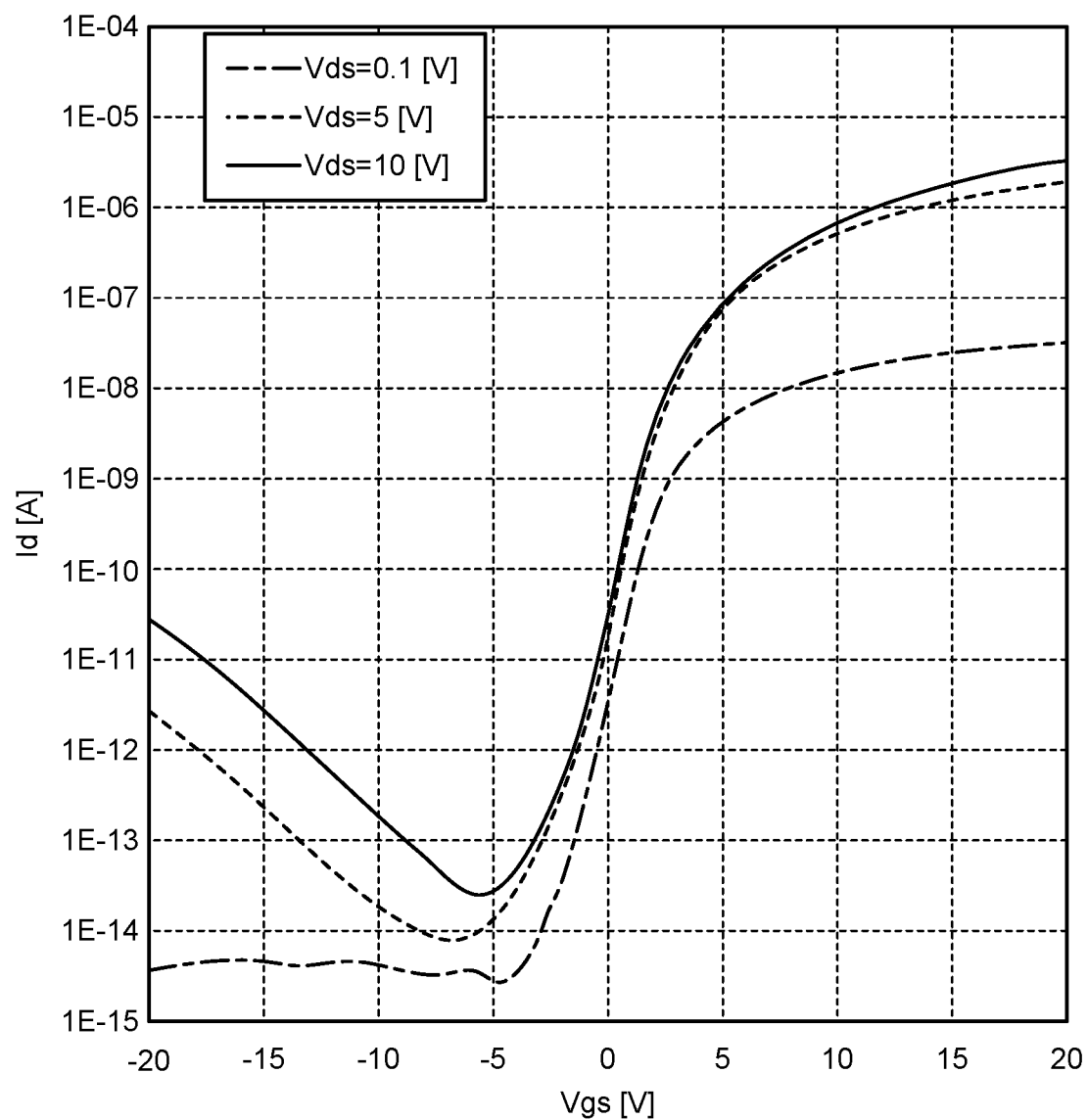
FIG. 4 is a graph illustrating an example of transistor characteristics of a switching element.

FIG. 4 is a graph illustrating an example of characteristics of the thin film transistor TFT of the switching element 1. The longitudinal axis (Id [A]) in FIG. 4 indicates the magnitude of a leakage current of the switching element 1. The transverse axis (Vgs [V]) in FIG. 4 indicates a voltage that is applied to between the gate and the source of the switching element 1. When the switching element 1 is an N-type MOS transistor, the positive direction of the transverse axis indicates that a gate potential is higher than a source potential and the negative direction of the transverse axis indicates that the gate potential is lower than the source potential. FIG. 4 illustrates a graph with alternate long and short dash curve obtained when a source-drain voltage (Vds) of the switching element 1 is 0.1 [V], a graph with dashed curve obtained when the source-drain voltage of the switching element 1 is 5 [V], and a graph with solid curve obtained when the source-drain voltage of the switching element 1 is 10 [V].

The graphs in FIG. 4 indicate that the leakage current is increased as a distance from the point of origin at a lower left point is increased. When a positive voltage is applied to the gate, the switching element 1 is made to be an ON state where the source and the drain are electrically connected to each other. When a negative voltage is applied to the gate, the switching element 1 is made to be an OFF state where the source and the drain are electrically disconnected from each other. The switching element 1 has a characteristic that the leakage current is logarithmically increased when the negative voltage applied to the gate is increased. The switching element 1 has a characteristic that the leakage current is increased when the source-drain voltage thereof is increased.

Figure 5:
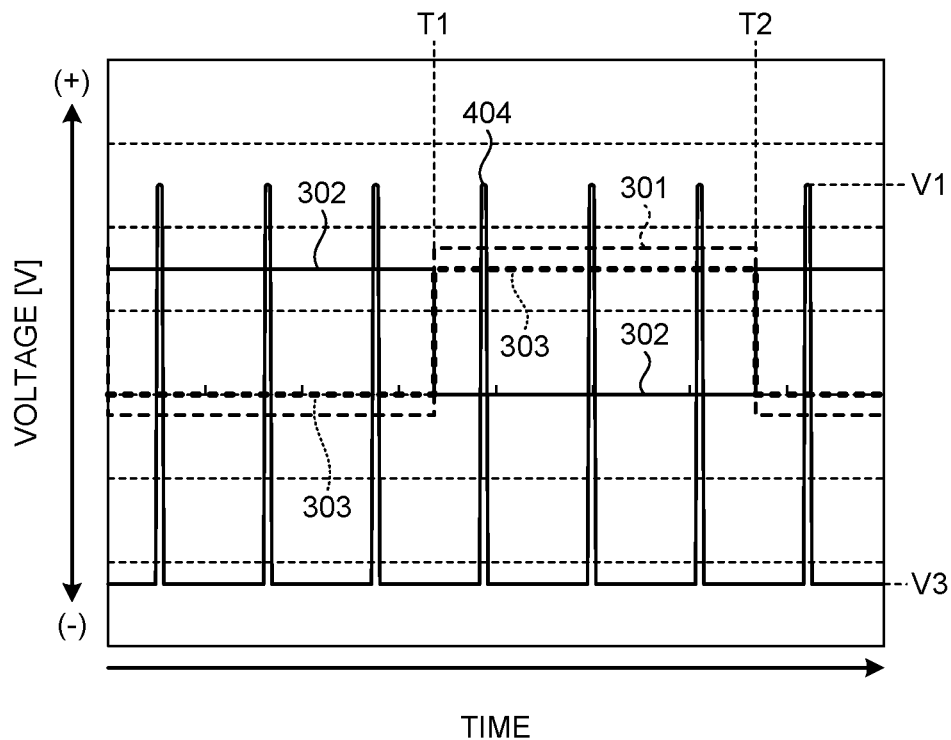
FIG. 5 is a timing chart illustrating a drive waveform of a row of pixels the writing period of each of which is provided last in scanning related to pixel driving of a liquid crystal display panel in a comparative example.
Figure 6:
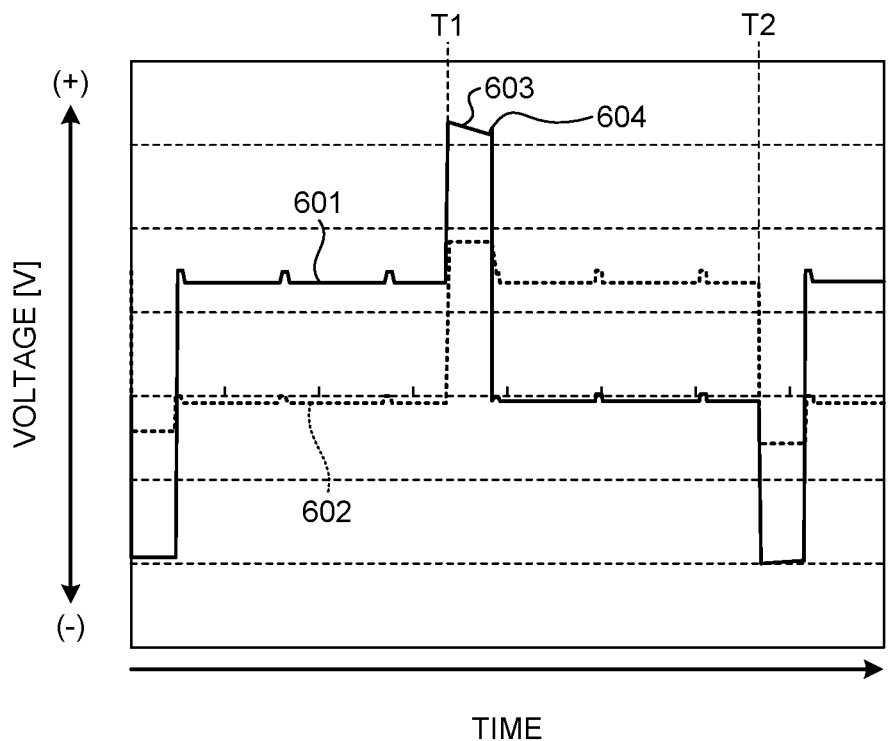
FIG. 6 is a timing chart illustrating transitions of potentials applied to pixel electrodes of the pixels to which the drive waveform illustrated in FIG. 5 is given.
Figure 7:
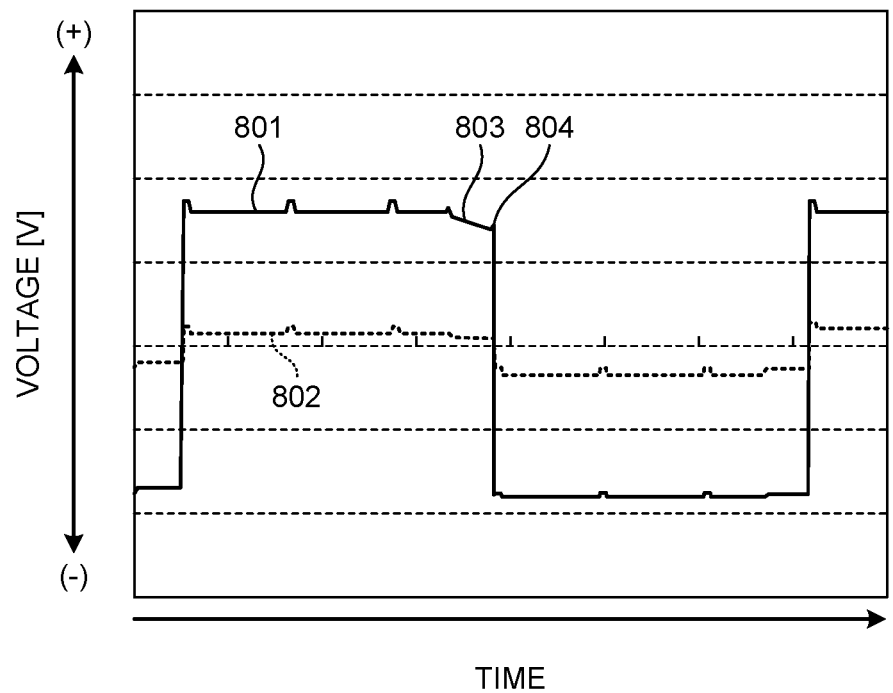
FIG. 7 is a timing chart illustrating potentials provided by subtracting a VCOM drive signal from the potentials illustrated in FIG. 6.

FIG. 5 is a timing chart illustrating a drive waveform of the row of the pixels Pix the writing period of each of which is provided last in scanning related to pixel driving of the liquid crystal display panel. The timings and potentials of first potential pulses 404 illustrated in FIG. 5 are similar to the timings and potentials of first potential pulses 1104 illustrated in FIG. 9. FIG. 6 is a timing chart illustrating transitions of the potentials applied to the pixel electrodes 2 of the pixels Pix to which the drive waveform illustrated in FIG. 5 is given. FIG. 6 exemplifies a potential transition 601 when the gradation degree of the pixel Pix is the highest (white raster) and a potential transition 602 when the gradation degree of the pixel Pix is the lowest (black raster). FIG. 7 is a timing chart illustrating potentials provided by subtracting a VCOM drive signal 301 from the potentials illustrated in FIG. 6. Voltage transitions 801 and 802 illustrated in FIG. 7 are provided by subtracting a potential transition of the VCOM drive signal 301 from the potential transitions 601 and 602. That is to say, the voltage transitions indicate waveforms of voltage between the common electrode 6 and the pixel electrodes 2. FIG. 7 illustrates a period 803 corresponding to a period of a peak 603 illustrated in FIG. 6.

In the example illustrated in FIG. 5, only a third potential V3 is applied in periods other than the timings at which a first potential V1 is applied. With such gate potential control of the switching elements 1, the leakage currents between the sources and the drains of the switching elements 1 are increased because the potentials (potentials applied to the pixel electrodes 2) of the signal lines 4 are significantly lower than the potentials of the scan lines 5 in the period of the peak 603 after the inversion driving. With the increased leakage currents, change in the holding voltage until the first potential pulse 404 is applied to the gates of the switching elements 1 after first timing T1 becomes larger, as indicated by potential change at the peak 603 and voltage change in the period 803. That is to say, a period during which the leakage currents occur and the degree of change thereof varies depending on the positions of the pixels Pix in the column direction. This causes the degree of change in luminance to vary depending on the positions of the pixels Pix in the column direction, whereby a phenomenon in which the luminance is uneven depending on the positions of the pixels Pix in the column direction is visually recognized.

In the example illustrated in FIG. 5, a voltage for causing the gate to be off (OFF voltage) after the first timing T1, is kept to be the third potential V3. Thus, a voltage rise 804 is generated because the difference between the third potential V3 and the first potential V1 of the first potential pulse 404 is larger than the difference between a second potential V2 and the first potential V1 of the first potential pulse 404. The voltage rise 804 can cause flickers.

As described above, the inversion driving causes the potentials of the pixel electrodes 2 coupled to the switching elements 1 to largely fluctuate to positive and negative. The voltage rise 804 is thereby increased when the potentials of the pixel electrodes become relatively low. Due to this, even when potential control of the common electrode 6 facing the pixel electrodes 2 is simultaneously performed, reduction of a direct current (DC current) and prevention of the flickers are insufficient. In particular, as described above with reference to FIG. 5, influences of the DC current and the flickers are large for pixels coupled to the scan line 5 to which the drive signal is applied by the scan circuit 9 relatively later. In other words, a phenomenon is visually recognized in which a lighting state in a display screen of the liquid crystal display device becomes uneven depending on the position of the scan line 5 to which the pixels Pix are coupled, in the alignment direction. This causes problems in the display quality and lifetime of the liquid crystal display device.

Figure 8:
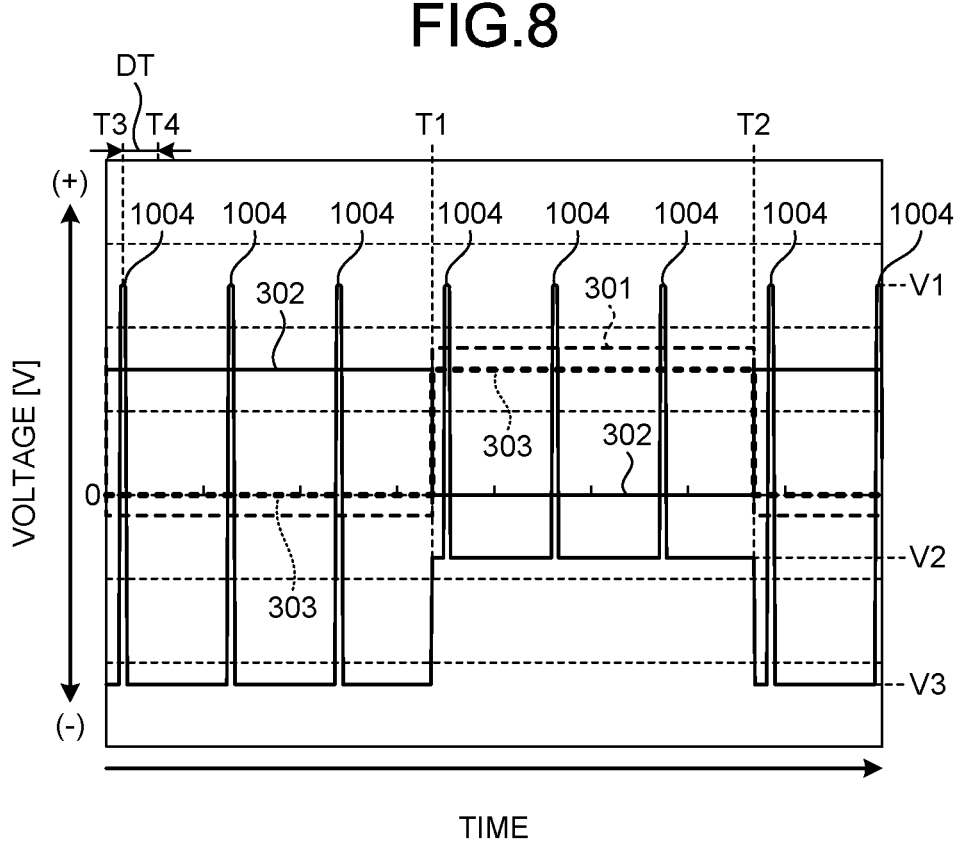
FIG. 8 is a timing chart illustrating a drive waveform of a row of pixels the writing period of each of which is provided first in scanning in a display device according to a first embodiment.
Figure 9:
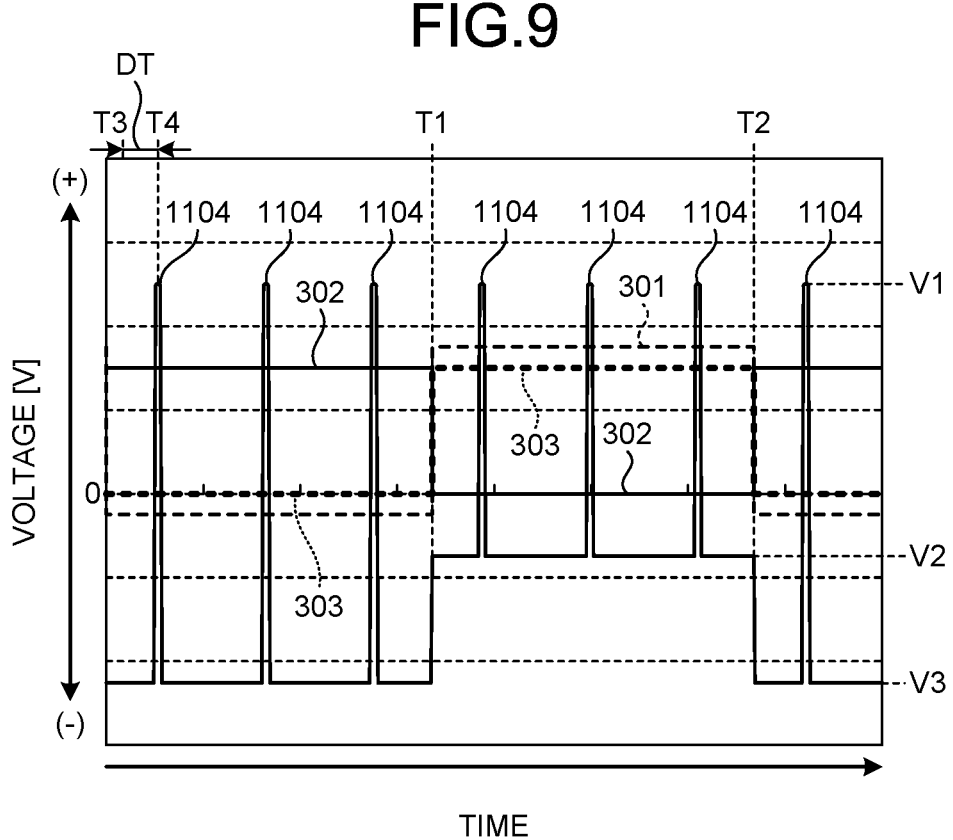
FIG. 9 is a timing chart illustrating a drive waveform of a row of the pixels the writing period of each of which is provided last in the scanning in the display device in the first embodiment.

FIG. 8 is a timing chart illustrating a drive waveform of the row of the pixels Pix the writing period of each of which is provided first in scanning in the display device 100 in the first embodiment. FIG. 9 is a timing chart illustrating a drive waveform of the row of the pixels Pix the writing period of each of which is provided last in the scanning in the display device 100 in the first embodiment. The timing charts illustrating the drive waveforms in FIGS. 8 and 9 and FIGS. 5, 14, and 15, which will be described later, illustrate relative potential high-low levels of the VCOM drive signal 301 corresponding to the waveform of the common potential, a pixel signal potential 302 when the gradation degree of the pixel Pix is the highest (white raster), and a pixel signal potential 303 when the gradation degree of the pixel Pix is the lowest (black raster). The potential difference between the pixel signal potential 302 and the VCOM drive signal 301 is larger than that between the pixel signal potential 303 and the VCOM drive signal 301.

In the timing charts illustrating the drive waveforms in FIGS. 8 and 9 and FIGS. 14 and 15, which will be described later, potentials (source voltages) that are settable to the pixel electrodes 2 fall, for example, within a range of 0 [V] to 15 [V]. Unlike the source voltages, the positive (+) potential of the common electrode 6 is higher than 15 [V] and lower than the first potential V1, which will be described later. The negative (−) potential of the common electrode 6 is lower than 0 [V] and higher than the second potential V2, which will be described later. A reference potential that the VCOM drive circuit 10 applies to the common electrode 6 is either of the positive (+) potential of the common electrode 6 or the negative (−) potential of the common electrode 6.

The VCOM drive circuit 10 outputs the VCOM drive signal 301 so as to switch the potential of the common electrode 6 in accordance with the timing of the inversion driving. In the example illustrated in FIG. 8, FIG. 9, and other figures, the potential of the common electrode 6 is switched from negative (−) to positive (+) at the first timing T1. The potential of the common electrode 6 is switched from positive (+) to negative (−) at second timing T2. The timings at which the potential of the common electrode 6 is switched by the inversion driving are common regardless of the positions of the pixels Pix.

On the other hand, the timing of the writing period of the pixel Pix, that is, the timing at which the first potential V1 causing the source and the drain of the switching element 1 included in the pixel Pix to be electrically connected to each other is applied to the gate of the switching element 1, varies depending on the position of the pixel Pix in the column direction (position of the pixel row). There is time difference DT between application timing T3 (see FIG. 8) of the first potential V1 to the row of the pixels Pix the writing period of each of which is provided first and application timing T4 (see FIG. 8) of the first potential V1 to the row of the pixels Pix the writing period of each of which is provided last in the same field period (for example, the first field period F11) of the same frame period. That is to say, FIG. 8 illustrates the waveform of the first scan line 5 and FIG. 9 illustrates the waveform of the last scan line 5 when the scanning is performed in order from one side (for example, the upper side in FIG. 1) to the other side (for example, the lower side in FIG. 1) in the alignment direction of the scan lines 5.

As indicated by first potential pulses 1004 in FIG. 8 and first potential pulses 1104 in FIG. 9, the timings at which the first potential V1 is applied to the gates of the switching elements 1 are generated periodically. That is to say, the time difference (for example, the time difference DT) due to difference in the positions of the pixels Pix in the column direction is generated regardless of the colors of the field periods.

In the first embodiment, the source and the drain of each switching element 1 are made to be electrically connected to or disconnected from each other multiple times in accordance with gradation outputs of multiple colors (for example, red (R), green (G), and blue (B)) in a predetermined cycle (for example, one frame period) as described with reference to FIG. 3. Thus, the first potential pulse 1004 and the first potential pulse 1104 are generated as many times as the number of colors (for example, three) to cause the source and the drain of the switching element 1 to be electrically connected to or disconnected from each other in a period from the first timing T1 to the second timing T2 corresponding to one frame period.

The scan circuit 9 applies the second potential V2 or the third potential V3 to the gates of the switching elements 1 regardless of the positions of the pixels Pix in the column direction in the periods excluding the timings at which the first potential V1 is applied. The second potential V2 and the third potential V3 are potentials that cause the source and the drain to be electrically disconnected from each other. The third potential V3 is lower than the second potential V2. As illustrated in FIG. 8 and FIG. 9, the scan circuit 9 in the first embodiment applies the third potential V3 to the gate of each switching element 1 in periods in which the potential of the common electrode 6 is negative (−). The scan circuit 9 applies the second potential V2 to the gate of each switching element 1 in periods in which the potential of the common electrode 6 is positive (+). As described above, the scan circuit 9 in the first embodiment switches the potentials of the scan lines 5 to the third potential V3 from the second potential V2 at timings at which the potential of the common electrode 6 is made relatively lower than that of each pixel electrode 2 in the periods in which the source and the drain are electrically disconnected from each other. The scan circuit 9 in the first embodiment switches the potentials of the scan lines 5 to the second potential V2 from the third potential V3 at timings at which the potential of the common electrode 6 is made relatively higher than that of each pixel electrode 2 in the periods in which the source and the drain are electrically disconnected from each other.

The first potential V1 is, for example, 25 [V]. The first potential V1 is set to reliably cause the source and the drain of each switching element 1 to be electrically connected to each other with reference to the highest potential (for example, 15 [V]) that is applied to the pixel electrodes 2 of the pixels Pix. The second potential V2 is, for example, −7 [V]. The third potential V3 is, for example, −22 [V]. The second potential V2 and the third potential V3 are set to potentials with margins so that each switching element 1 can sufficiently achieve an OFF state with respect to the lowest potential (for example, 0 [V]) that is applied to the pixel electrodes 2 of the pixels Pix. That is to say, the third potential V3 is set to a potential with a margin so that each switching element 1 can sufficiently achieve an OFF state in accordance with the negative (−) potential of the common electrode 6. The second potential V2 is set to a potential in a range with such margins that each switching element 1 can sufficiently achieve an OFF state so as to reduce the difference between the second potential V2 and the positive (+) potential of the common electrode 6 and the difference between the third potential V3 and the negative (−) potential of the common electrode 6.

The positive (+) potential of the common electrode 6 and the negative (−) potential thereof are desirably adjusted such that the DC voltage to be applied to the liquid crystal 3 is decreased as much as possible in order to increase the lifetime of the liquid crystal 3 and prevent the flickers.

For example, the power supply circuit 14 (see FIG. 1) generates the first potential V1, the second potential V2, and the third potential V3. The power supply circuit 14 supplies the potentials corresponding to the first potential V1, the second potential V2, and the third potential V3 to the scan circuits 9 upon supply of electric power W from the outside. Although not illustrated in the drawings, the power supply circuit 14 may generate potentials appropriate for the operations of the components included in the display device 100 and supply power to the components. The scan circuit 9 may have a function of generating the first potential V1, the second potential V2, and the third potential V3 by receiving supply of power from the outside.

Figure 10:
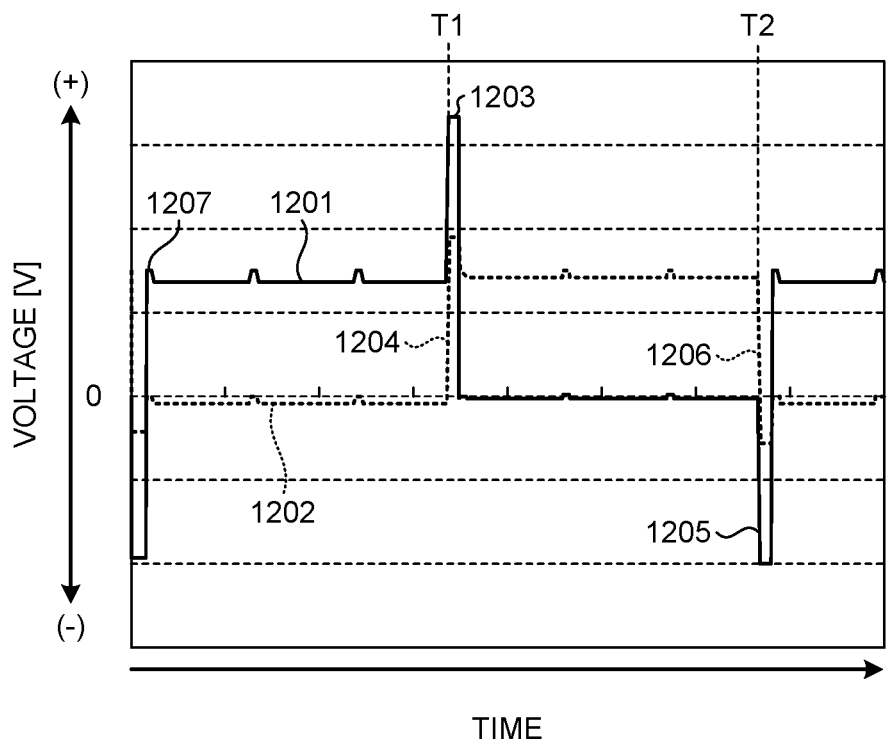
FIG. 10 is a timing chart illustrating transitions of potentials applied to pixel electrodes of the pixels to which the drive waveform illustrated in FIG. 8 is given.
Figure 11:
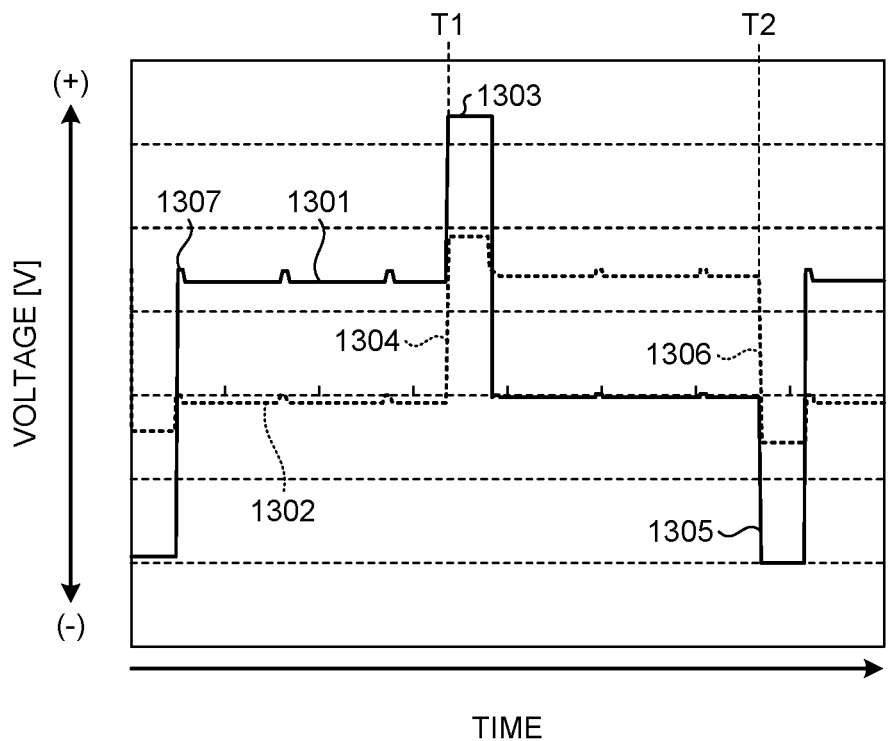
FIG. 11 is a timing chart illustrating transitions of potentials applied to the pixel electrodes of the pixels to which the drive waveform illustrated in FIG. 9 is given.

FIG. 10 is a timing chart illustrating transitions of the potentials applied to the pixel electrodes 2 of the pixels Pix to which the drive waveform illustrated in FIG. 8 is given. FIG. 10 exemplifies a potential transition 1201 when the gradation degree of the pixel Pix is the highest (white raster) and a potential transition 1202 when the gradation degree of the pixel Pix is the lowest (black raster). FIG. 11 is a timing chart illustrating transitions of the potentials applied to the pixel electrodes 2 of the pixels Pix to which the drive waveform illustrated in FIG. 9 is given. FIG. 11 exemplifies a potential transition 1301 when the gradation degree of the pixel Pix is the highest (white raster) and a potential transition 1302 when the gradation degree of the pixel Pix is the lowest (black raster). That is to say, FIG. 10 illustrates the transition of the potential that is applied to the pixel electrode 2 of the pixel Pix coupled to the first scan line 5 and FIG. 11 illustrates the transition of the potential that is applied to the pixel electrode 2 of the pixel Pix coupled to the last scan line 5 when the scanning is performed in order from one side (for example, the upper side in FIG. 1) to the other side (for example, the lower side in FIG. 1) in the alignment direction of the scan lines 5.

In the potential transitions 1201 and 1202 illustrated in FIG. 10, the pixel potential rises (1203, 1204) in accordance with variation in the potential of the common electrode 6, due to capacitive coupling between the common electrode 6 and the pixel electrode 2 at the first timing T1 at which the potential of the common electrode 6 is switched from negative (−) to positive (+) by the inversion driving. In the potential transitions 1201 and 1202 illustrated in FIG. 10, the pixel potential drops (1205, 1206) in accordance with the variation in the potential of the common electrode 6, due to the capacitive coupling between the common electrode 6 and the pixel electrode 2 at the second timing T2 at which the potential of the common electrode 6 is switched from positive (+) to negative (−) by the inversion driving. After the voltage rises (1203, 1204) and the voltage drops (1205, 1206), the first potential V1 (first potential pulse 1004) is applied to the gate of the switching element 1 of the pixel Pix including the pixel electrode 2, and the pixel signal is supplied to the pixel electrode 2 from the signal line 4. With this operation, the potential that is applied to the pixel electrode 2 becomes a potential in accordance with the pixel signal.

As is the case with the potential transitions 1201 and 1202 illustrated in FIG. 10, in the potential transitions 1301 and 1302 illustrated in FIG. 11, the pixel potential rises (1303, 1304) in accordance with the variation in the potential of the common electrode 6, due to the capacitive coupling between the common electrode 6 and the pixel electrode 2 at the first timing T1. The pixel potential drops (1305, 1306) in accordance with the variation in the potential of the common electrode 6, due to the capacitive coupling between the common electrode 6 and the pixel electrode 2 at the second timing T2. After the voltage rises (1303, 1304) and the voltage drops (1305, 1306), the first potential V1 (first potential pulse 1104) is applied to the gate of the switching element 1 of the pixel Pix including the pixel electrode 2, and the pixel signal is supplied to the pixel electrode 2 from the signal line 4. With this operation, the potential that is applied to the pixel electrode 2 becomes a potential in accordance with the pixel signal. A period in which the potential remains at a high level at each of the peaks 1303 and 1304 is longer than that at the peaks 1203 and 1204. A period in which the potential remains at a low level at each of the peaks 1305 and 1306 is longer than that at the peaks 1205 and 1206. This is because the timing at which the first potential V1 is applied to the gate of the switching element 1 varies depending on the position of the pixel Pix in the column direction. Accordingly, the durations of the peaks 1203, 1204, 1205, and 1206 are the shortest for the row of the pixels Pix the writing period of each of which is provided first in the scanning. The durations of the peaks 1303, 1304, 1305, and 1306 are the longest for the row of the pixels Pix the writing period of each of which is provided last in the scanning.

In the first embodiment, the potential of the pixel electrode 2 that remains at the high level at each of the peaks 1303 and 1304 and the potential of the pixel electrode 2 that remains at the low level at each of the peaks 1305 and 1306 are hardly changed until the ends of the peaks. This is because, as described above, the relation between the potential of the gate of the switching element 1 and the potential of the common electrode 6 is controlled such that the second potential V2 is applied to the gate of the switching element 1 in the period in which the potential of the common electrode 6 is positive (+) and the third potential V3 is applied to the gate of the switching element 1 in the period in which the potential of the common electrode 6 is negative (−). With this operation, the difference between the potential of the gate of the switching element 1 and the potential of the common electrode 6 is controlled so as not to become larger than necessary, which otherwise would be larger due to switching of the potential of the common electrode 6. If the difference between the potential of the gate of the switching element 1 and the potential of the common electrode 6 becomes larger than necessary, the leakage current between the source and the drain of the switching element 1 is further increased, which makes it difficult to keep the potential of the pixel electrode 2. In the first embodiment, such increase in the leakage current is restrained by using the second potential V2 and the third potential V3 in accordance with situations.

Figure 12:
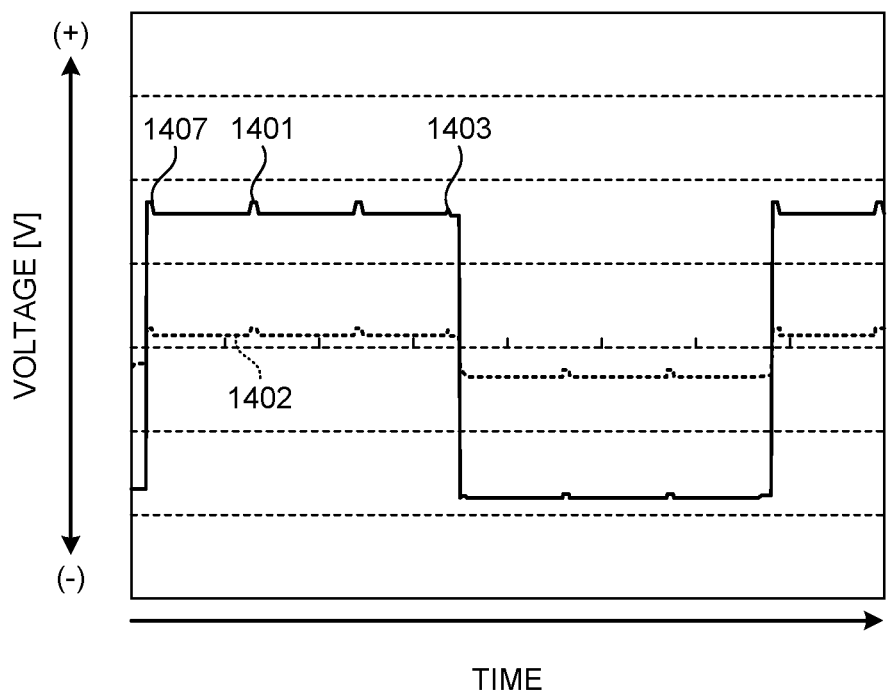
FIG. 12 is a timing chart illustrating potentials provided by subtracting the VCOM drive signal from the potentials illustrated in FIG. 10.
Figure 13:
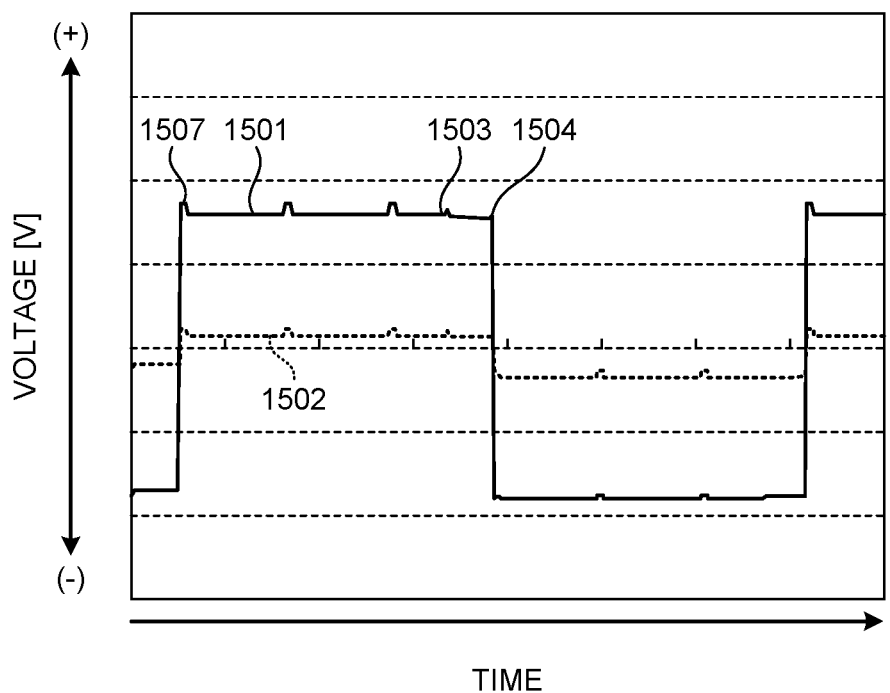
FIG. 13 is a timing chart illustrating potentials provided by subtracting the VCOM drive signal from the potentials illustrated in FIG. 11.

FIG. 12 is a timing chart illustrating potentials provided by subtracting the VCOM drive signal 301 from the potentials illustrated in FIG. 10. Voltage transitions 1401 and 1402 illustrated in FIG. 12 are provided by subtracting the potential transition of the VCOM drive signal 301 from the potential transitions 1201 and 1202. That is to say, the timing chart indicates voltage waveforms between the common electrode 6 and the pixel electrode 2. In FIG. 12, a period 1403 corresponding to the period of the peak 1203 illustrated in FIG. 10 is illustrated. FIG. 13 is a timing chart illustrating potentials provided by subtracting the VCOM drive signal 301 from the potentials illustrated in FIG. 11. Voltage transitions 1501 and 1502 illustrated in FIG. 13 are provided by subtracting the potential transition of the VCOM drive signal 301 from the potential transitions 1301 and 1302. That is to say, the timing chart indicates voltage waveforms between the common electrode 6 and the pixel electrode 2. In FIG. 13, a period 1503 corresponding to the period of the peak 1303 illustrated in FIG. 11 is illustrated.

Each of the potentials illustrated in FIG. 12 and FIG. 13 indicates voltage (holding voltage) between the pixel electrode 2 and the common electrode 6 that substantially acts on the liquid crystal 3 of the pixel Pix. The holding voltage in the period 1403 (corresponding to 1203 in FIG. 10) illustrated in FIG. 12 is substantially the same as the holding voltage before the period 1403 that is indicated by the voltage transition 1401. Similarly, the holding voltage in the period 1503 (corresponding to 1303 in FIG. 11) illustrated in FIG. 13 is substantially the same as the holding voltage before the period 1503 that is indicated by the voltage transition 1501. According to the first embodiment, it is possible to prevent occurrence of a large difference in the holding voltage due to a relation between the first timing T1 and the timing of the first potential V1 immediately after the first timing T1, that is, the positions of the pixels Pix in the column direction. Thus, occurrence of the phenomenon can be restrained in which the luminance is uneven depending on the positions of the pixels Pix in the column direction. In FIG. 13, a slight voltage rise 1504 is generated at a timing corresponding to the first potential pulse 1104 that is a first pulse after the first timing T1. The voltage rise 1504 is however small in a range of variation in the voltage indicated by the voltage transition 1501 and thus gives substantially no influence on the translucency of the pixels Pix, that is, the luminance. That is to say, occurrence of the flickers due to the voltage rise 1504 can be restrained. Occurrence of the DC current to the liquid crystal 3 in the pixels Pix due to the slight voltage rise 1504 arises substantially no problem, thereby preventing reduction in the lifetime of the liquid crystal 3 due to the voltage rise 1504.

According to the first embodiment, it is possible to reduce the occurrence of the phenomenon in which the luminance is uneven depending on the positions of the pixels Pix in the column direction as described above. According to the first embodiment, it is possible to reduce the occurrence of the flickers and restrain reduction in the lifetime of the liquid crystal 3. Thus, according to the first embodiment, it is possible to restrain the reduction in the lifetime due to the DC current flowing through the liquid crystal 3 while keeping higher display quality.

The timings at which the light source 11 illuminating the liquid crystal display panel P is lighted are the holding periods, that is, the potential holding periods of the pixel electrodes 2 that are set between a plurality of number of timings at each of which the sources and the drains of the switching elements 1 are electrically connected. The liquid crystal display panel P is illuminated with light in the different colors in the field periods in one frame period, so that output corresponding to the gradation values of the colors can be made in each of the pixels Pix.

The light source 11 includes the first light source 11R, the second light source 11G, and the third light source 11B. The multiple connected periods in one frame period in each of which the sources and the drains are electrically connected, include the writing period of the pixel signal corresponding to red (R) among the gradation values of red (R), green (G), and blue (B) of the RGB data, the writing period of the pixel signal corresponding to green (G) among them, and the writing period of the pixel signal corresponding to blue (B) among them. Output corresponding to the gradation values of RGB can thereby be made in the pixels Pix.

Second Embodiment

Next, a display device according to a second embodiment will be described with reference to FIG. 14 to FIG. 19. The display device in the second embodiment is the same as the display device 100 in the first embodiment except for those specially described with reference to FIG. 14 to FIG. 19.

Figure 14:
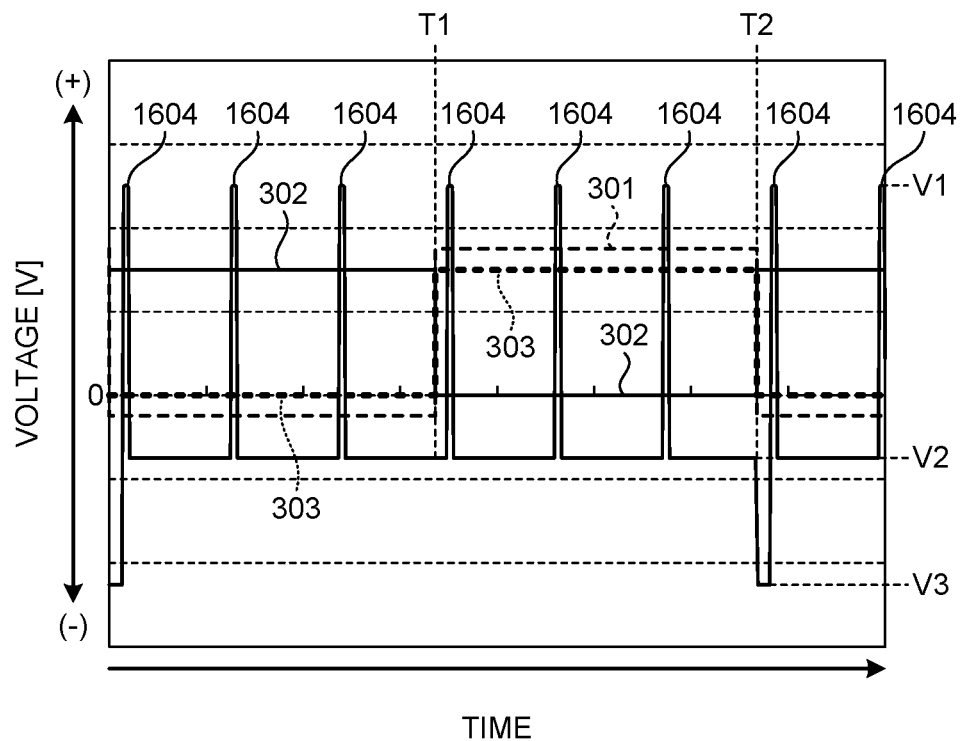
FIG. 14 is a timing chart illustrating a drive waveform of a row of pixels the writing period of each of which is provided first in scanning in a second embodiment.
Figure 15:
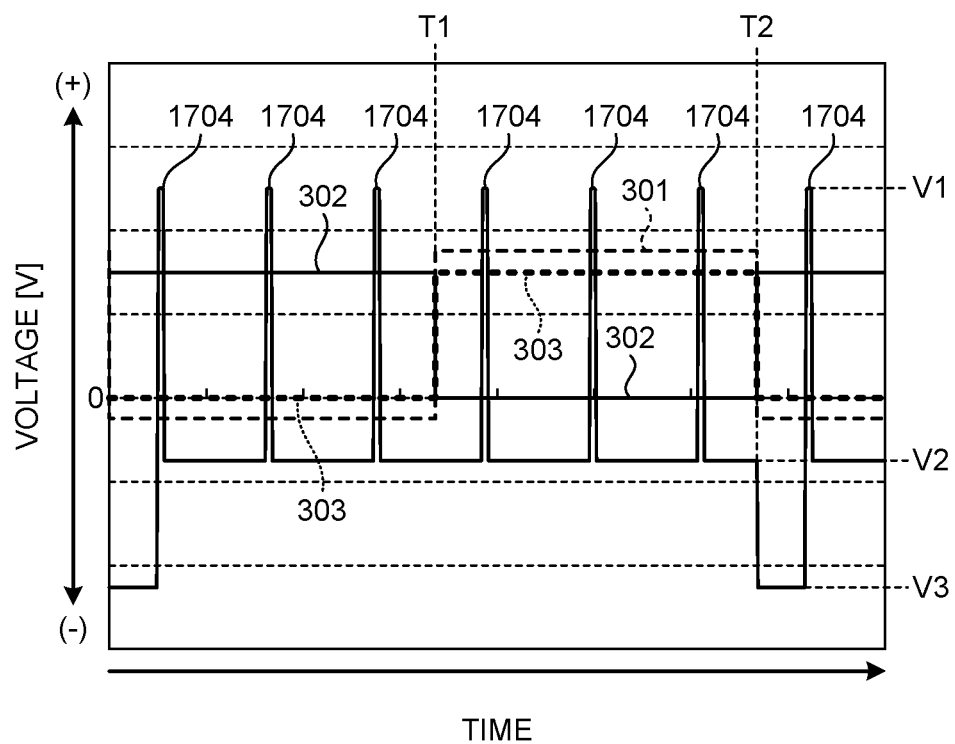
FIG. 15 is a timing chart illustrating a drive waveform of a row of the pixels the writing period of each of which is provided last in the scanning in the second embodiment.

FIG. 14 is a timing chart illustrating a drive waveform of a row of the pixels Pix the writing period of each of which is provided first in scanning in the second embodiment. FIG. 15 is a timing chart illustrating a drive waveform of a row of the pixels Pix the writing period of each of which is provided last in the scanning in the second embodiment. That is to say, FIG. 14 illustrates the waveform of the first scan line 5 and FIG. 15 illustrates the waveform of the last scan line 5 when the scanning is performed in order from one side (for example, the upper side in FIG. 1) to the other side (for example, the lower side in FIG. 1) in the alignment direction of the scan lines 5.

As illustrated in FIG. 14 and FIG. 15, the scan circuit 9 in the second embodiment applies the second potential V2 to the gates of the switching elements 1 in a period in which the potential of the common electrode 6 is positive (+), as is the case with the scan circuit 9 in the first embodiment. The scan circuit 9 in the second embodiment switches the potential that is applied to the gates of the switching elements 1 from the second potential V2 to the third potential V3 at a timing at which the potential of the common electrode 6 is switched from positive (+) to negative (−). After first potential pulses 1604 and 1704 generated thereafter, the scan circuit 9 switches the potential that is applied to the gates of the switching elements 1 to the second potential V2. The scan circuit 9 in the second embodiment thus switches the potentials of the scan lines 5 from the second potential V2 to the third potential V3 at a timing at which the potential of the common electrode 6 is made relatively lower than that of each pixel electrode 2 in a period in which the source and the drain are electrically disconnected from each other. The scan circuit 9 in the second embodiment sets the potentials of the scan lines 5 that have been the third potential V3 before a timing at which the sources and the drains are made to be a connected state from a disconnected state, to the second potential V2 when the sources and the drains are made to be a disconnected state after the timing.

Figure 16:
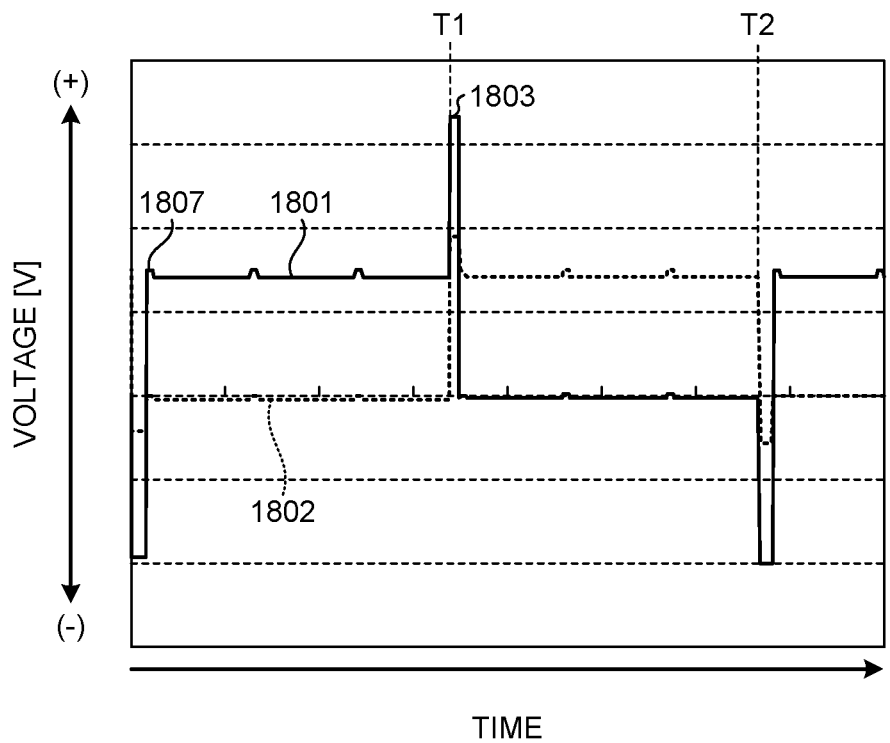
FIG. 16 is a timing chart illustrating transitions of potentials applied to the pixel electrodes of the pixels to which the drive waveform illustrated in FIG. 14 is given.
Figure 17:
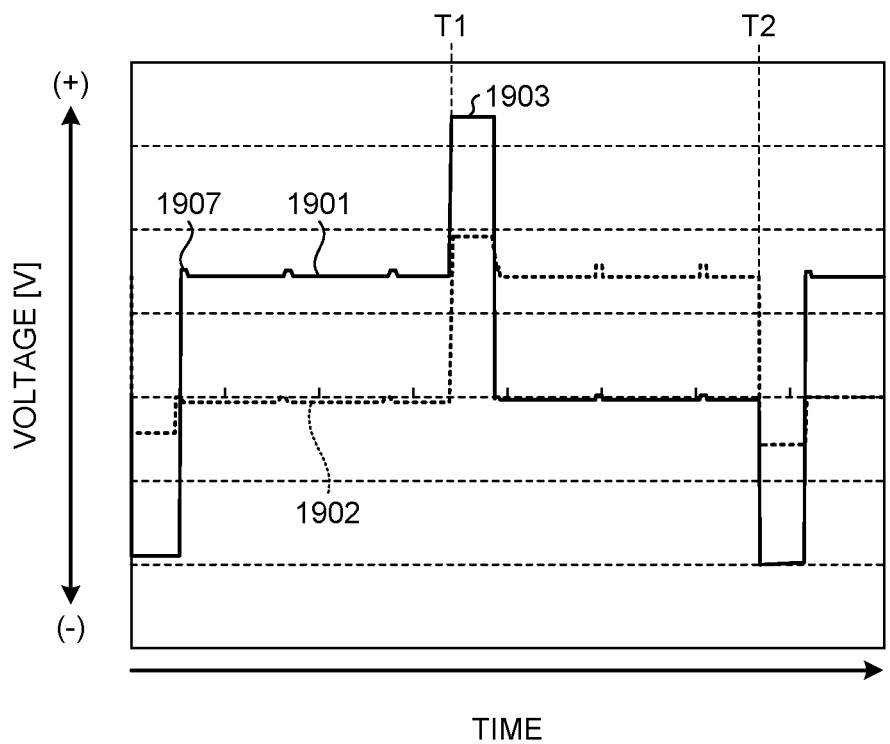
FIG. 17 is a timing chart illustrating transitions of potentials applied to the pixel electrodes of the pixels to which the drive waveform illustrated in FIG. 15 is given.

FIG. 16 is a timing chart illustrating transitions of the potentials applied to the pixel electrodes 2 of the pixels Pix to which the drive waveform illustrated in FIG. 14 is given. FIG. 16 exemplifies a potential transition 1801 when the gradation degree of the pixel Pix is the highest (white raster) and a potential transition 1802 when the gradation degree of the pixel Pix is the lowest (black raster). FIG. 17 is a timing chart illustrating transitions of the potential applied to the pixel electrodes 2 of the pixels Pix to which the drive waveform illustrated in FIG. 15 is given. FIG. 17 exemplifies a potential transition 1901 when the gradation degree of the pixel Pix is the highest (white raster) and a potential transition 1902 when the gradation degree of the pixel Pix is the lowest (black raster).

Figure 18:
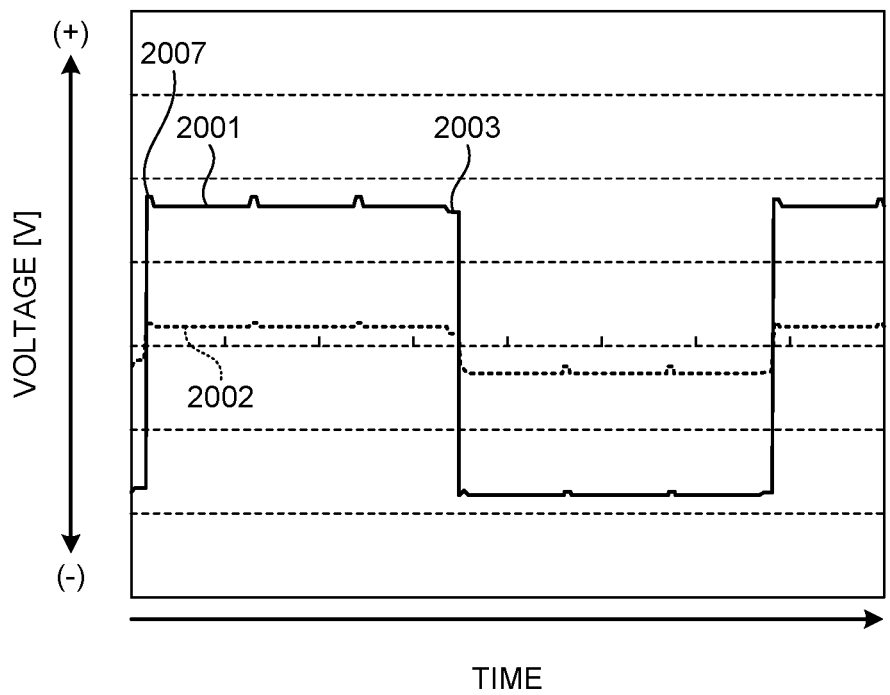
FIG. 18 is a timing chart illustrating potentials provided by subtracting the VCOM drive signal from the potentials illustrated in FIG. 16.
Figure 19:
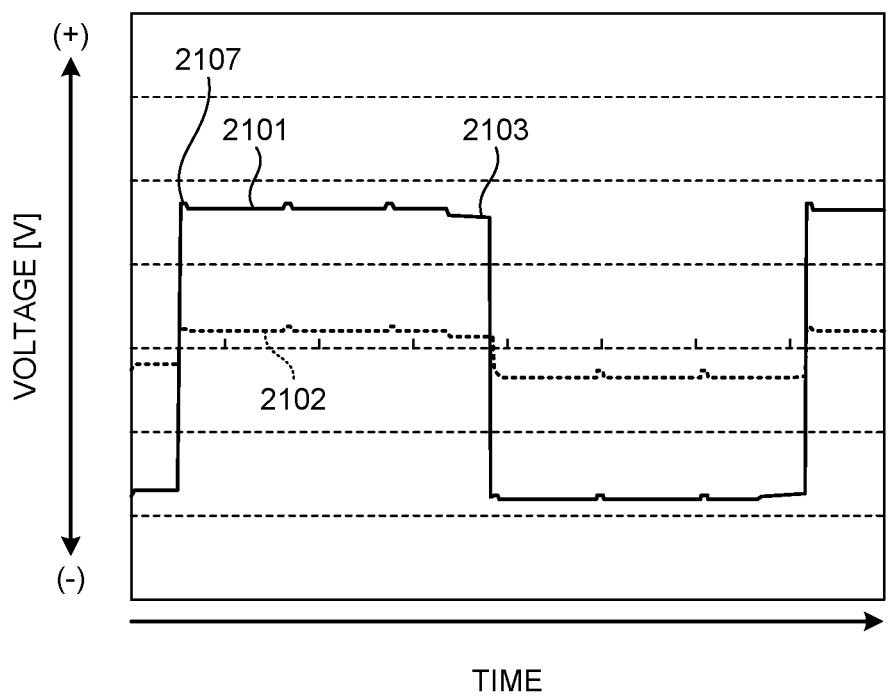
FIG. 19 is a timing chart illustrating potentials provided by subtracting the VCOM drive signal from the potentials illustrated in FIG. 17.

FIG. 18 is a timing chart illustrating potentials provided by subtracting the VCOM drive signal 301 from the potentials illustrated in FIG. 16. That is to say, the timing chart indicates voltage waveforms between the common electrode 6 and the pixel electrodes 2. Voltage transitions 2001 and 2002 illustrated in FIG. 18 are provided by subtracting the potential transition of the VCOM drive signal 301 from the potential transitions 1801 and 1802. In FIG. 18, a period 2003 corresponding to a period of a peak 1803 illustrated in FIG. 16 is illustrated. FIG. 19 is a timing chart illustrating potentials provided by subtracting the VCOM drive signal 301 from the potentials illustrated in FIG. 17. Voltage transitions 2101 and 2102 illustrated in FIG. 19 are provided by subtracting the potential transition of the VCOM drive signal 301 from the potential transitions 1901 and 1902. That is to say, the timing chart indicates voltage waveforms between the common electrode 6 and the pixel electrodes 2. In FIG. 19, a period 2103 corresponding to a period of a peak 1903 illustrated in FIG. 17 is illustrated.

In the second embodiment, the potentials of the pixel electrodes 2 are switched from the second potential V2 to the third potential V3 at a timing at which the potential of the common electrode 6 is switched from positive (+) to negative (−), so that the voltage between the common electrode 6 and the gates of the switching elements 1 before and after the timing is kept at a high level to hold the disconnected state between the sources and the drains of the switching elements 1. That is to say, this operation reduces malfunctions of the switching elements 1 that the sources and the drains of the switching elements 1 are unintentionally made to be electrically connected due to decrease in the voltage between the common electrode 6 and the gates of the switching elements 1 after the above-mentioned timing. In addition thereto, after the first potential V1 is applied to the gates of the switching elements 1 after the above-mentioned timing, the potential for causing the gate to be off is set to the second potential V2 in the second embodiment. In other words, in the second embodiment, it is possible to reduce, except the potential difference between a gate-off potential (third potential V3) and one-time first potential V1 at a timing after the above-mentioned timing, the potential difference between a gate-off potential (second potential V2) and the first potential V1 at other timings. Thus, the shift amount of the holding voltages of the pixels Pix to the negative voltage side can be reduced in comparison with that in the first embodiment. DC balance of the liquid crystal 3 can thereby be further improved. A period in which the potentials of the scan lines 5 are the second potential V2 in the second embodiment is longer than that in the first embodiment. Thus, potential spikes that are generated due to parasitic capacitance between the potentials of the scan lines 5 and the source potentials (potentials of the pixel electrodes 2) based on the pixel signals can be made small. To be more specific, a spike 1807 in FIG. 16, a spike 1907 in FIG. 17, a spike 2007 in FIG. 18, and a spike 2107 in FIG. 19 are smaller than a spike 1207 in FIG. 10, a spike 1307 in FIG. 11, a spike 1407 in FIG. 12, and a spike 1507 in FIG. 13.

The combination of the colors of the light sources included in the light source 11 is not limited to the combination of red (R), green (G), and blue (B). The light source 11 may include the light sources corresponding to three colors of a combination of cyan, magenta, and yellow.

Figure 20:
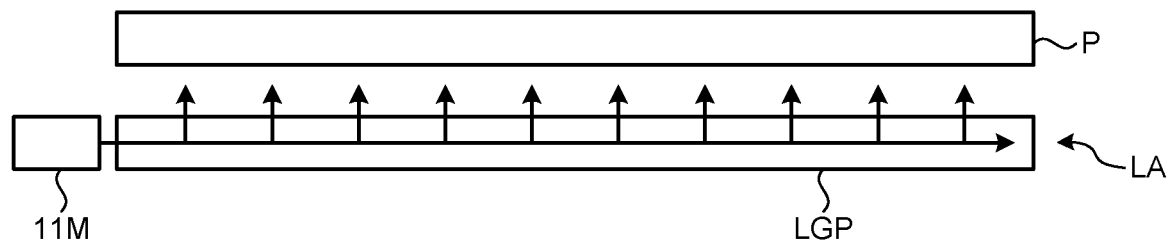
FIG. 20 is a schematic view illustrating an example of the configuration of a light source device.

FIG. 20 is a schematic view illustrating an example of the configuration of a light source device LA. It is sufficient that the light source device L (or the light source device LA) can illuminate the liquid crystal display panel P, and the specific arrangement thereof can be appropriately changed. For example, as schematically illustrated in FIG. 1, the light sources of multiple colors such as the first light source 11R, the second light source 11G, and the third light source 11B may be arranged directly on or above the light emission surface of the light source 11 that illuminates the liquid crystal display panel P from the rear surface side thereof. Alternatively, a configuration in which a multicolor light source 11M is arranged on the lateral side of a light guiding plate LGP provided on the rear surface of the liquid crystal display panel P may be employed as illustrated in FIG. 20. The multicolor light source 11M includes light sources corresponding to the three colors of the combination of the first light source 11R, the second light source 11G, and the third light source 11B or the combination of cyan, magenta, and yellow, for example, and is controlled to emit light in different colors in the respective field periods in one frame period.

Specific numerical values including the first potential V1, the second potential V2, the third potential V3, and the other potentials exemplified above are merely examples, and the present disclosure is not limited thereto. They can be appropriately changed in a range keeping relative relations of positive and negative and relative two values.

Other action effects provided by the aspects described in the embodiments that are obvious from description of the present specification or at which those skilled in the art can appropriately arrive should be interpreted to be reasonably provided by the present disclosure.

What is claimed is:
1. A display device comprising:
   a liquid crystal display panel in which a liquid crystal is sealed between two substrates facing each other;
   two electrodes provided in the liquid crystal display panel and configured to be provided with a potential difference for controlling orientation of the liquid crystal;
   a switching element having a source and a drain one of which is coupled to one of the two electrodes;
   a scan line coupled to a gate of the switching element and configured to be provided with a potential for causing the source and the drain of the switching element to be electrically connected or disconnected;
   a signal line coupled to the other of the drain and the source;

an inversion driver configured to invert relative potential high-low levels between a potential of one of the two electrodes and a potential of the other of the two electrodes at a predetermined cycle; and a scan circuit configured to provide a first potential, a second potential, or a third potential to the scan line, wherein the first potential is a potential for causing the source and the drain to be electrically connected, the second potential is a potential for causing the source and the drain to be electrically disconnected, the third potential is a potential for causing the source and the drain to be electrically disconnected and is lower than the second potential, the source and the drain are caused to be electrically connected and disconnected multiple times in the predetermined cycle, and the scan circuit applies the second potential to the gate of the switching element when the potential of one of the two electrodes is positive and applies the third potential to the gate of the switching element when the potential of the one of the two electrodes is negative, and switches from the second potential to the third potential at a timing at which the relative potential high-low levels between the potentials of the two electrodes are inverted, in a period in which the source and the drain are electrically disconnected.

2. The display device according to claim 1, wherein the scan circuit switches the potential of the scan line from the third potential to the second potential at a timing at which the potential of the other of the two electrodes is made relatively higher than the potential of the one of the two electrodes in the period in which the source and the drain are electrically disconnected.

3. The display device according to claim 1, wherein the scan circuit sets the potential of the scan line that has been the third potential before a timing at which the source and the drain are made to be a connected state from a disconnected state, to the second potential when the source and the drain are made to be a disconnected state after the timing.

4. The display device according to claim 1, wherein a timing at which a light source configured to illuminate the liquid crystal display panel is lighted is a potential holding period of the one of the two electrodes that is set between a plurality of number of timings at each of which the source and the drain are electrically connected.

5. The display device according to claim 4, wherein the light source includes a light source of a first color, a light source of a second color, and a light source of a third color.

6. The display device according to claim 5, wherein a combination of the first color, the second color, and the third color is a combination of red, green, and blue or a combination of cyan, magenta, and yellow.

7. The display device according to claim 5, wherein a plurality of connected periods in the predetermined cycle in each of which the source and the drain are electrically connected, include a writing period of a pixel signal corresponding to the first color, a writing period of a pixel signal corresponding to the second color, and a writing period of a pixel signal corresponding to the third color.

8. The display device according to claim 4, wherein the light source is provided on an opposite side to a display surface on which an image is displayed in the liquid crystal display panel.

9. The display device according to claim 4, wherein the light source is provided on a lateral side of the liquid crystal display panel.

10. The display device according to claim 1, wherein the liquid crystal is a polymer dispersion type liquid crystal.

11. The display device according to claim 1, wherein the two electrodes include a common electrode and a pixel electrode.

12. A display device comprising:
a liquid crystal display panel in which a liquid crystal is sealed between two substrates facing each other;

two electrodes provided in the liquid crystal display panel and configured to be provided with a potential difference for controlling orientation of the liquid crystal, wherein the two electrodes comprise a pixel electrode and a common electrode;

a switching element having a source and a drain one of which is coupled to one of the two electrodes;

a scan line coupled to a gate of the switching element and configured to be provided with a potential for causing the source and the drain of the switching element to be electrically connected or disconnected;

a signal line coupled to the other of the drain and the source;

an inversion driver configured to invert relative potential high-low levels between a potential of one of the two electrodes and a potential of the other of the two electrodes at a predetermined cycle; and a scan circuit configured to provide a first potential, a second potential, or a third potential to the scan line, wherein the first potential is a potential for causing the source and the drain to be electrically connected, the second potential is a potential for causing the source and the drain to be electrically disconnected, the third potential is a potential for causing the source and the drain to be electrically disconnected and is lower than the second potential, the source and the drain are caused to be electrically connected and disconnected multiple times in the predetermined cycle, and the scan circuit applies the second potential to the gate of the switching element when the potential of the common electrode is positive and applies the third potential to the gate of the switching element when the potential of the common electrode is negative, and switches from the second potential to the third potential at a timing at which the relative potential high-low levels between the potentials of the two electrodes are inverted, in a period in which the source and the drain are electrically disconnected.

13. The display device according to claim 12, wherein the scan circuit switches the potential of the scan line from the third potential to the second potential at a timing at which the potential of the other of the two electrodes is made relatively higher than the potential of the one of the two electrodes in the period in which the source and the drain are electrically disconnected.

14. The display device according to claim 12, wherein the scan circuit sets the potential of the scan line that has been the third potential before a timing at which the source and the drain are made to be a connected state from a disconnected state, to the second potential when the source and the drain are made to be a disconnected state after the timing.

15. The display device according to claim 12, wherein a timing at which a light source configured to illuminate the liquid crystal display panel is lighted is a potential holding period of the one of the two electrodes that is set between a plurality of number of timings at each of which the source and the drain are electrically connected.

16. The display device according to claim 15, wherein the light source includes a light source of a first color, a light source of a second color, and a light source of a third color.

17. The display device according to claim 16, wherein a combination of the first color, the second color, and the third color is a combination of red, green, and blue or a combination of cyan, magenta, and yellow.

18. The display device according to claim 16, wherein a plurality of connected periods in the predetermined cycle in each of which the source and the drain are electrically connected, include a writing period of a pixel signal corresponding to the first color, a writing period of a pixel signal corresponding to the second color, and a writing period of a pixel signal corresponding to the third color.

19. The display device according to claim 15, wherein the light source is provided on an opposite side to a display surface on which an image is displayed in the liquid crystal display panel.

20. The display device according to claim 15, wherein the light source is provided on a lateral side of the liquid crystal display panel.

21. The display device according to claim 12, wherein the liquid crystal is a polymer dispersion type liquid crystal.

* * * * *